(12) United States Patent
Haymond

(10) Patent No.: US 10,906,505 B2
(45) Date of Patent: Feb. 2, 2021

(54) CHILD SEAT RESTRAINING SYSTEM AND METHOD OF USE

(71) Applicant: Laura Ellem Haymond, Woodland, TX (US)

(72) Inventor: Laura Ellem Haymond, Woodland, TX (US)

(*) Notice: Subject to any disclaimer, the term of this patent is extended or adjusted under 35 U.S.C. 154(b) by 0 days.

(21) Appl. No.: 16/183,611

(22) Filed: Nov. 7, 2018

(65) Prior Publication Data
US 2019/0135228 A1 May 9, 2019

Related U.S. Application Data

(60) Provisional application No. 62/582,834, filed on Nov. 7, 2017.

(51) Int. Cl.
B60R 22/48 (2006.01)
B60N 2/00 (2006.01)
A44B 11/25 (2006.01)
A47D 15/00 (2006.01)
B60N 2/28 (2006.01)

(52) U.S. Cl.
CPC .......... *B60R 22/48* (2013.01); *A44B 11/2569* (2013.01); *A47D 15/006* (2013.01); *B60N 2/002* (2013.01); *B60N 2/2812* (2013.01); *B60N 2002/2815* (2013.01); *B60R 2022/4816* (2013.01); *B60R 2022/4866* (2013.01)

(58) Field of Classification Search
None
See application file for complete search history.

(56) References Cited

U.S. PATENT DOCUMENTS

| 10,232,821 | B1* | 3/2019 | Cubit ................. B60R 25/1001 |
| 2010/0253498 | A1* | 10/2010 | Rork ...................... B60N 2/002 |
| | | | 340/457.1 |
| 2018/0096578 | A1* | 4/2018 | Mattarocci ........... B60N 2/2821 |

* cited by examiner

Primary Examiner — Thomas S McCormack
(74) Attorney, Agent, or Firm — Richard Eldredge; Leavitt Eldredge Law Firm

(57) ABSTRACT

A child car seat system includes a car seat having a strap with a restraining device to secure over a body of a child; a sensing system to be incorporated into the restraining device, the sensing system having a first sensor associated with a first half of the restraining device; a second sensor associated with a second half of the restraining device; a third sensor secured positioned within a body of the restraining device; a control system in electrical communication with the first, second, and third sensors; and an alarm in communication with the control system; the alarm is activated via the control system when the first sensor and the second sensor are separated from one another, such as when the restraining device is unsecure; and the third sensor is to alert the control system when the car seat is occupied.

10 Claims, 6 Drawing Sheets

CHILD SEAT RESTRAINING SYSTEM AND METHOD OF USE

BACKGROUND

1. Field of the Invention

The present invention relates generally to car seat systems, and more specifically, to a car seat safety system for notifying a parent when a child has unrestraining deviced themselves.

2. Description of Related Art

Car seat systems are well known in the art and are effective means to improve safety associated with a child riding in a vehicle. For example, FIG. 1 depicts a conventional car seat system 101 having car seat 103 with one or more straps 105 and one or more restraining devices 107. During use, a child is strapped into seat 103 via straps 105 and restraining devices 107.

One of the problems commonly associated with system 101 is insufficient child monitoring. For example, children quickly learn to unrestraining device the one or more restraining devices associated with the straps. Once the child unrestraining devices themselves, they are exposed to increased danger. Commonly, parents are unaware of the child being unrestraining deviced.

Accordingly, although great strides have been made in the area of car seat systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
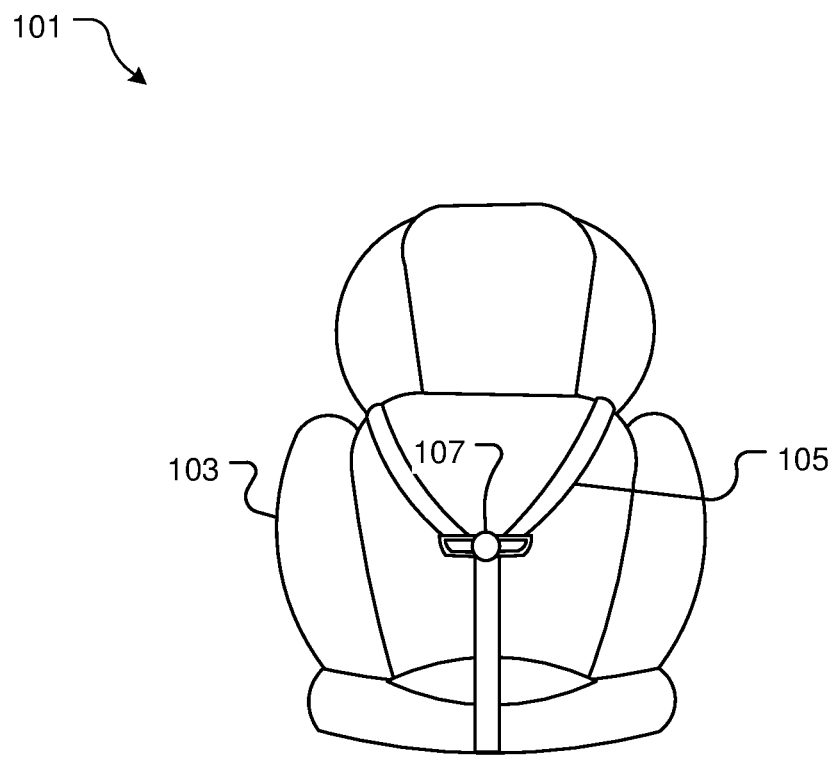
FIG. 1 is a front view of a common car seat system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional car seat systems. Specifically, the present invention provides a means to alert a parent when their child is unrestraining deviced from a car seat. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
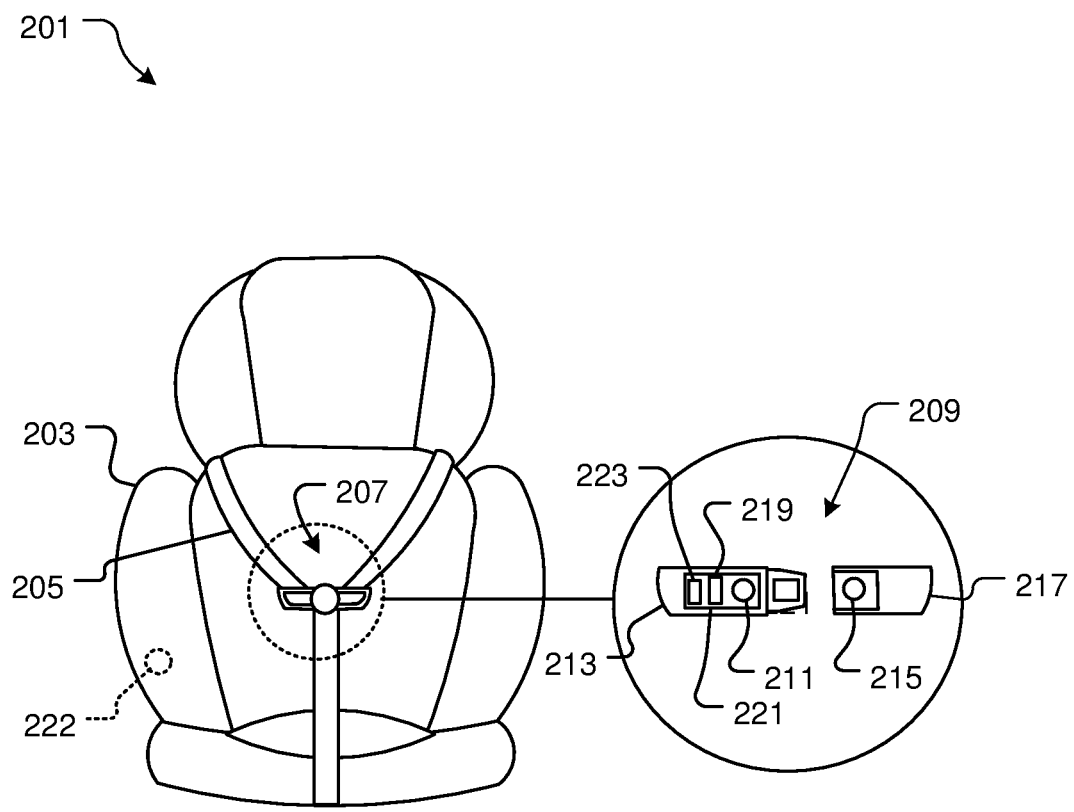
FIG. 2 is a front view of a car seat safety system in accordance with a preferred embodiment of the present application.

Referring now to the drawings wherein like reference characters identify corresponding or similar elements throughout the several views, FIG. 2 depicts a simplified front view of a car seat safety system 201 in accordance with a preferred embodiment of the present application. It will be appreciated that system 201 overcomes one or more of the above-listed problems commonly associated with conventional car seat systems.

In the contemplated embodiment, system 201 includes a car seat 203 having one or more straps 205 secured to one another via one or more restraining devices 207. It should be appreciated and understood that car seat 203 is used by way of example, and various sizes, shapes, and types of car seats are contemplated and that system 201 could be adapted for use with various types of straps and restraining devices. In addition, it should be appreciated that restraining device 207 could be adapted easily for use with other child seating apparatuses, such as high chairs, wheel chairs, strollers, baby bouncers, etc.

System 201 further includes a sensor system 209 incorporated into one of the restraining devices. In the preferred embodiment, sensor system 209 includes a first sensor 211 contained within a first half 213 of the restraining device and a second sensor 215 contained within a second half 217 of the restraining device. The first and second sensors are configured to recognize one another and thereby determine when the first and second half of the restraining device are connected, placing the first and second sensor in close proximity.

Sensor system 209 further includes a third sensor 219 and a control system 221, wherein the third sensor 219 is configured to detect a presence of a child within the car seat. System 201 further includes an alarm 223 in communication with control system 221 and configured to provide an alert upon the child unbuckling the seat belt. It is contemplated that alarm 223 can be incorporated into system 209 or can be a separate element configured to wirelessly communicate with control system 221. It should further be appreciated that alarm 223 can be a sound, a light, or any other means of alarm. System 209 can further include a deactivation button or switch 222 in communication with control system 221 and configured to provide a means for a parent/guardian to deactivate sensor system 209. In the preferred embodiment, button 222 is located in a position not accessible from the child sitting in the seat.

It should be appreciated that one of the unique features believed characteristic of the present application is the combination of sensors configured to provide a parent with an alert when a child unbuckles the seat belt. It should be understood that the third sensor's determination that a child is in the seat ensures that unnecessary alerting does not occur.

Figure 3A:
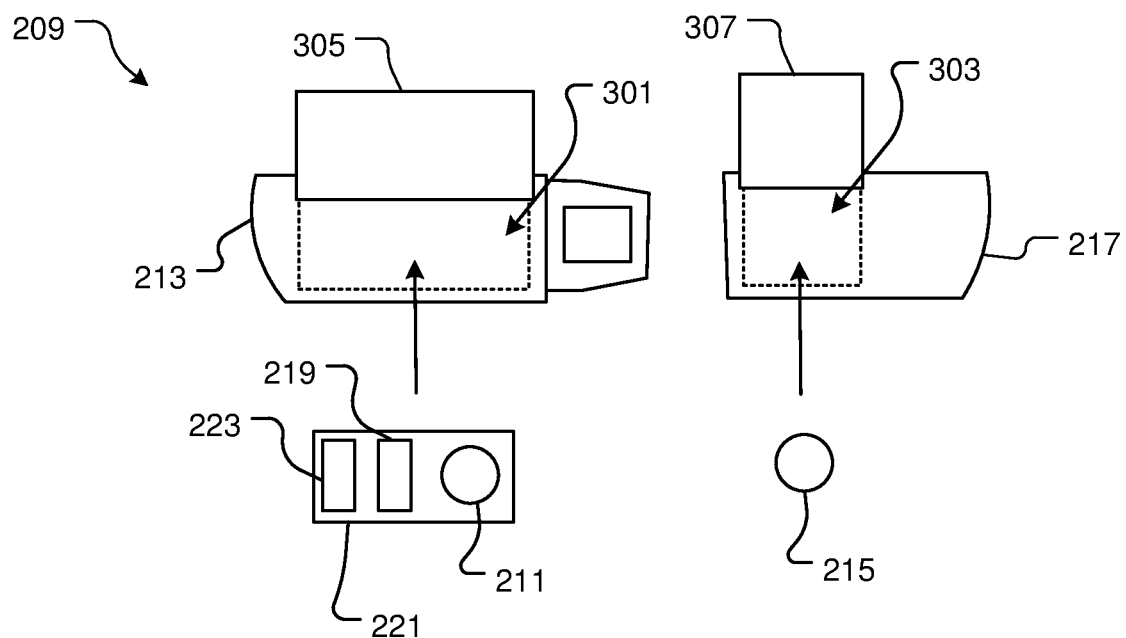
FIGS. 3A and 3B are simplified front views of a sensor system of FIG. 2.
Figure 3B:
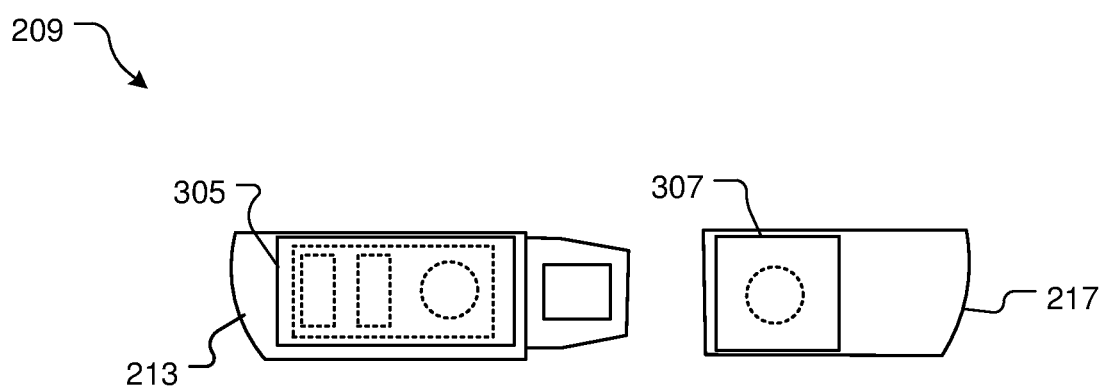

It is contemplated that the restraining device can have system 209 permanently integrated into the body of the restraining device, or alternatively, the various sensors and features can be removable and replaceable from the restraining device, as shown in FIGS. 3A and 3B. In this embodiment, the first half 213 and second half 217 each contain a cavity 301, 303 wherein the various components are inserted. It is contemplated that each cavity 301, 303 can have a door 305, 307 configured to provide access therein.

Figure 4A:
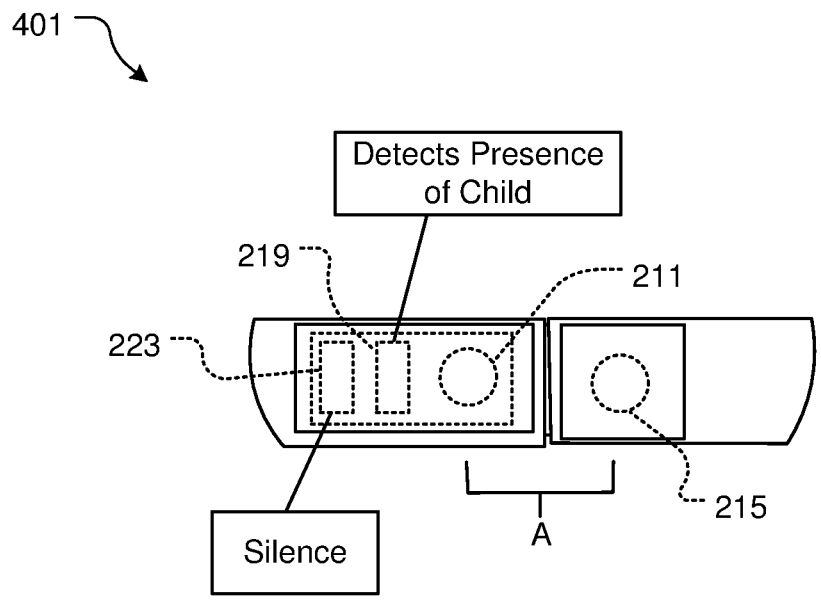
FIGS. 4A and 4B are simplified front views depicting the method of the sensor system of FIGS. 3A and 3B.
Figure 4B:
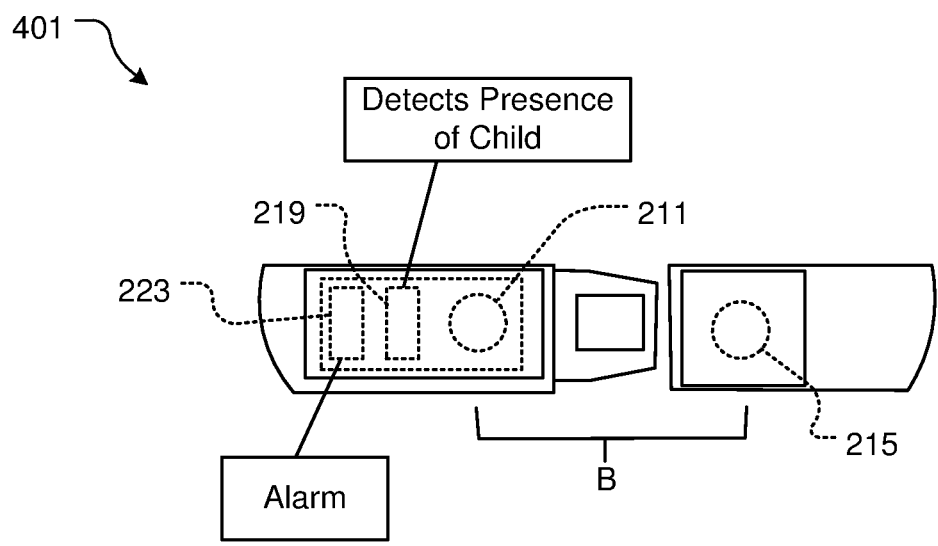

In FIGS. 4A and 4B, the method 401 associated with system 209 is shown. As shown in FIG. 4A, when the first sensor 211 and the second sensor 215 are in close proximity (indicated by line A), and the third sensor 219 detects the presence of a child, the control center commands the alarm 223 to remain deactivated. It should be understood that the close proximity is associated with the restraining device being in a closed and secured configuration. As shown in FIG. 4B, when the first and second sensors are distance from one another, indicated with line B, and the third sensor senses the presence of a child, the control center activates the alarm. It should be appreciated that distance B, represents the mere opening of the restraining device.

In the preferred embodiment, the first and second sensors are magnetic sensors configured to detect one another. However, alternative sensors such as wireless transceivers, or other devices could be used. In addition, in the preferred embodiment, the third sensor is a heat sensor configured to detect the body heat associated with a child, however, it should be appreciated that other sensors such as a light blocking sensor could be used.

Figure 5:
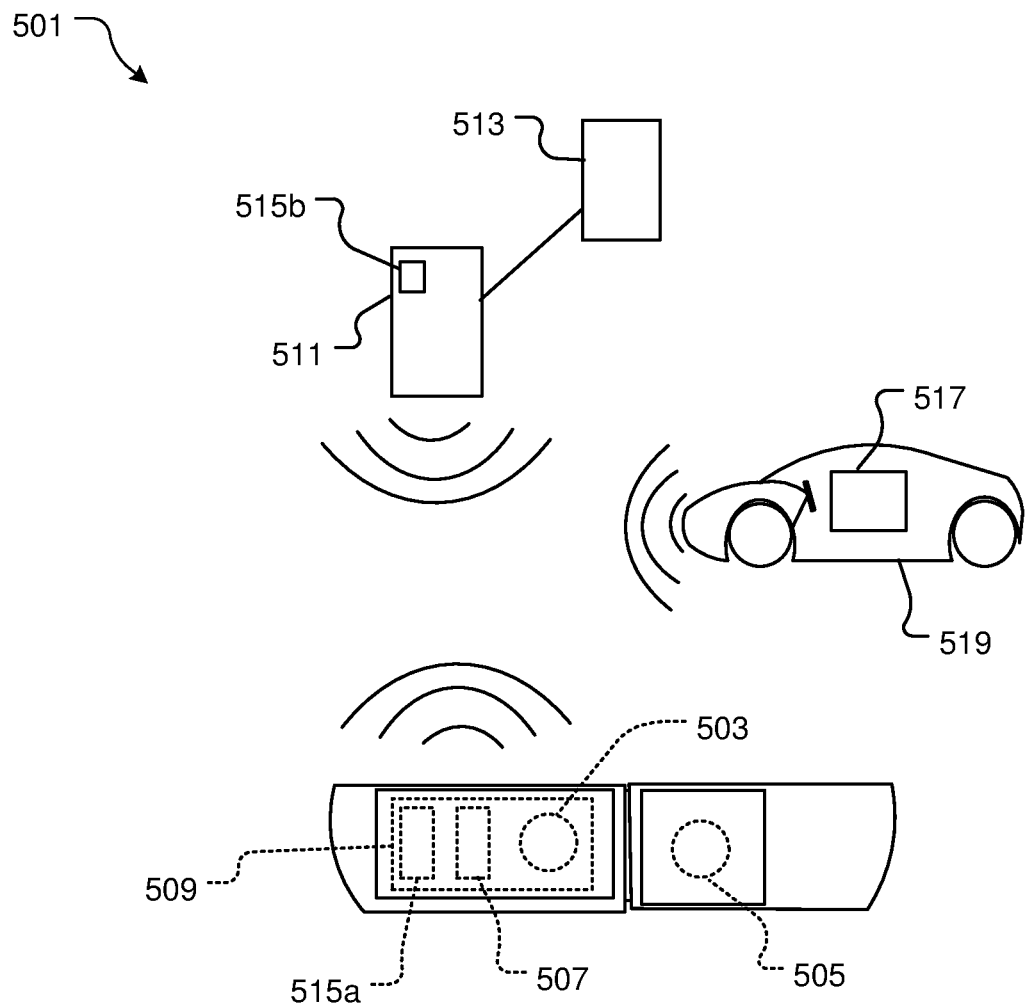
FIG. 5 is a simplified schematic of a sensor system in accordance with an alternative embodiment of the present application.

In FIG. 5, an alternative embodiment of a sensing system 501 is shown. In this embodiment, a first and second sensor 503, 505 are associated with opposite halves of a restraining device, and a third sensor 507 is configured to detect the presence of a child. In this embodiment, a control system 509 includes a transceiver configured to wirelessly communicate with a mobile electronic device 511, wherein a parent can receive notice regarding the sensing system via a mobile application 513 associated with the electronic device. It should be appreciated that in this configuration, an alarm 515a, 515b could be built into control system 509 or electronic device 511. In addition, it is contemplated that mobile application 511 could be used to communicate with control system 509 regarding the presence of a child in the car seat. In system 501, mobile application 513 can include a stop button configured to allow the parent to deactivate the alarm via the mobile electronic device. In this embodiment, the mobile electronic device could be a phone, a tablet, a computer, or any other similar device.

As further shown in FIG. 5, system 501 can further include a transceiver 517 associated with a vehicle control system 519, wherein the transceiver 517 can be configured to communicate wirelessly with the electronic device 511 or with the control system 509. In this embodiment, the control system 519 is programmed to deactivate any outside noise, such as a radio, associated with the vehicle and transmit the alarm through the vehicle speakers.

Figure 6:
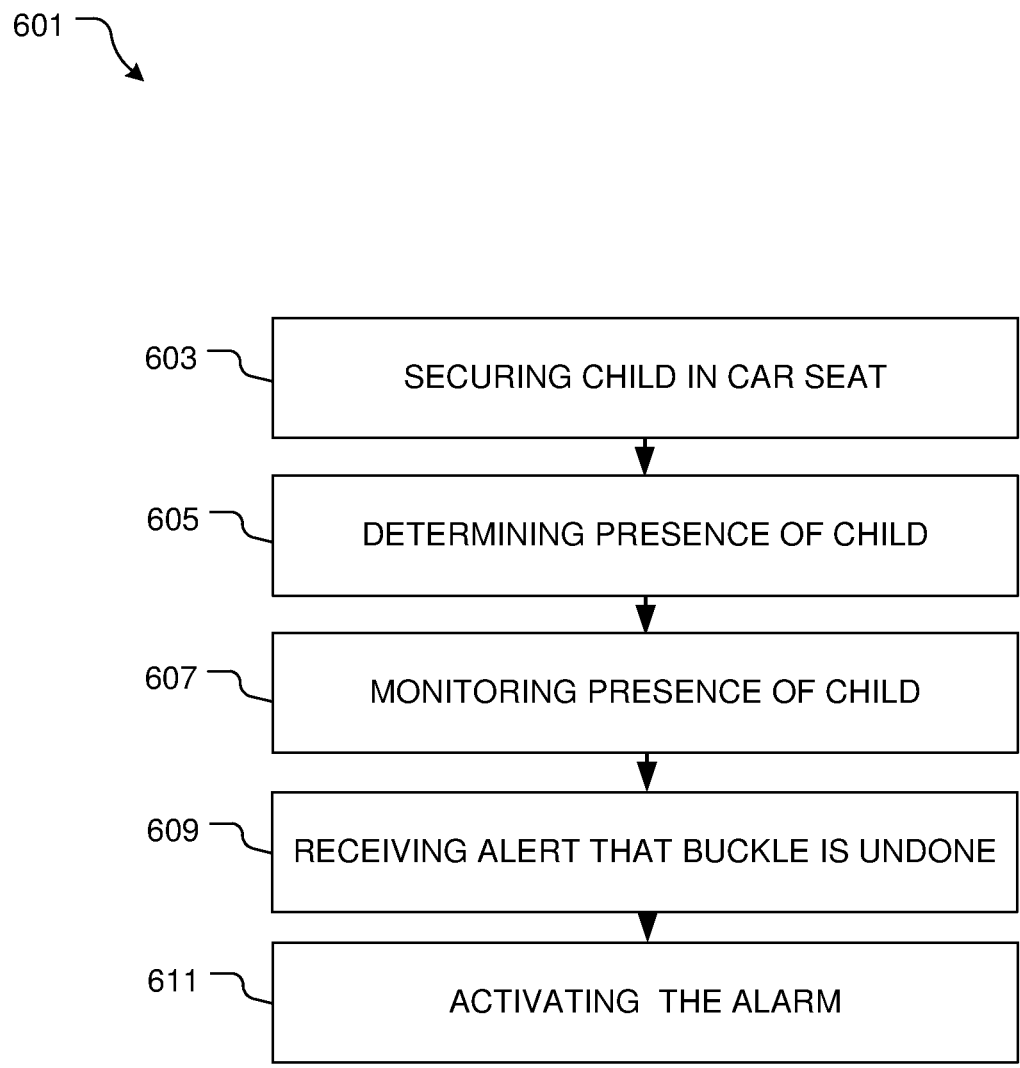
FIG. 6 is a flowchart of the method of use of the car safety system of FIG. 2.

In FIG. 6, a flowchart 601 depicts a method of use of system 201 and 501. A parent secures a child within the car seat by buckling the one or more restraining devices, as shown with box 603. The presence of the child is detected via a sensor, wherein the detection alerts the control system to monitor the restraining device, as shown with boxes 605, 607. Upon the child unbuckling the restraining device, an alert is received from the sensors, as shown with box 609. This alert indicates that the child is unsafe, and therefore an alarm is sounded, as shown with box 611.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:
1. A child restraining seat system, comprising:
   a child seat having:
      a strap with a restraining device configured to secure over a body of a child;
   a sensing system configured to be incorporated into the restraining device, the sensing system having:
      a first sensor associated with a first half of the restraining device;
      a second sensor associated with a second half of the restraining device;
      a third sensor secured positioned within a body of the restraining device, the third sensor is configured to detect the presence of a child in the child seat;
   a control system in electrical communication with the first, second, and third sensors, the control system having a wireless transceiver;
   an alarm in communication with the control system, the alarm is secured to the sensing system, the alarm is activated upon the presence of the child and as the first sensor and the second sensor are separated from each other; and
   a mobile device in data communication with the wireless transceiver, the control system is configured to send messages to the mobile device in the event that the alarm is activated;

wherein the alarm is activated via the control system when the first sensor and the second sensor are separated from one another, such as when the restraining device is undone; and wherein the third sensor is configured to alert the control system when the car seat is occupied.

2. The system of claim 1, wherein the first sensor and second sensor are magnetic sensors.

3. The system of claim 1, wherein the third sensor is a heat sensor configured to sense body heat of the child to determine the child's presence.

4. The system of claim 1, further comprising:
a vehicle control system having a transceiver configured to wirelessly communicate with the control system of the sensing system;
wherein the vehicle control system is configured to control audio exuded through speakers of the vehicle.

5. The system of claim 1, further comprising:
a deactivation button in communication with the sensing system, the deactivation button configured to deactivate the sensing system;
wherein the deactivation button is located a predetermined distance away from the restraining device, thereby being inaccessible by the child.

6. A restraining device configured to be incorporated into a strap of a car-seat, stroller, wheelchair, high chair, or the like, the restraining device comprising:
a sensing system incorporated into the restraining device, the sensing system having:
a first sensor associated with a first half of the restraining device; a second associated with a second half of the restraining device;
a third sensor secured positioned within a body of the restraining device;
a control system in electrical communication with the first, second, and third sensors, the control system having a wireless transceiver;
an alarm in communication with the control system, the alarm is secured to the sensing system, the alarm is activated upon the presence of the child and as the first sensor and the second sensor are separated from each other; and a mobile device in data communication with the wireless transceiver, the control system is configured to send messages to the mobile device in the event that the alarm is activated;
wherein the alarm is activated via the control system when the first sensor and the second sensor are separated from one another, such as when the restraining device is undone; and
wherein the third sensor is configured to alert the control system when the car seat is occupied.

7. The restraining device of claim 6, wherein the first sensor and the second sensor are magnetic.

8. The restraining device of claim 6, wherein the third sensor is a heat sensor configured to sense body heat of a child to determine the child's presence.

9. The restraining device of claim 6, further comprising:
a deactivation button in communication with the sensing system, the deactivation button configured to deactivate the sensing system;
wherein the deactivation button is located a predetermined distance away from the restraining device, thereby being inaccessible by the child.

10. A method of determining when a child is unrestrained from a seat, the method comprising:
providing the system of claim 1;
securing the child in the seat via the strap and the restraining device;
determining the presence of the child via the third sensor, the presence of the child being sent to the control system;
monitoring the presence of the child via the control system's determination that the first and second sensor are in close proximity, thereby indicating that the restraining device is secure; and
receiving an alert that the child has unsecured the restraining device via the control system's determination that the first sensor and the second sensor have been displaced from one another.

* * * * *